Patented Oct. 30, 1928.

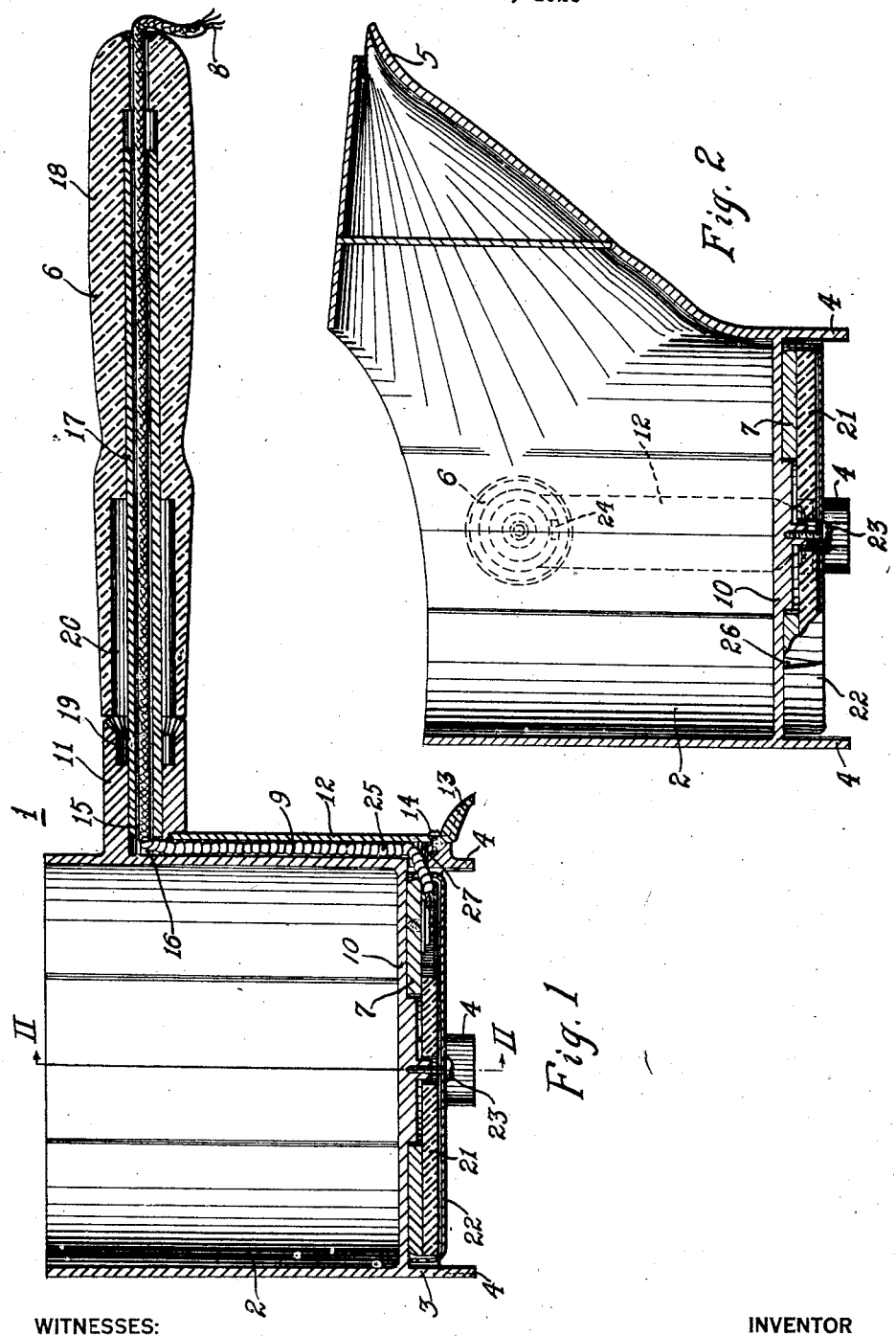

1,689,196

UNITED STATES PATENT OFFICE.

JOHN STRUTHERS DUNN, OF PHILADELPHIA, PENNSYLVANIA.

POURING LADLE.

Application filed February 10, 1925. Serial No. 8,136.

My invention relates to pouring ladles and particularly to electrically heated ladles.

One object of my invention is to provide an electrically heated ladle that shall have its pouring spout so disposed as to cause the ladle to be balanced during the pouring operation.

Another object of my invention is to provide a pouring ladle that shall have sufficient metal adjacent its pouring spout that the material being poured is heated during the pouring operation.

Another object of my invention is to provide a pouring ladle of such shape that the material in the ladle may be poured directly into any desired place without the body of the ladle interfering in any manner, the funnel-shaped spout of the ladle having such shape that the material is precluded from being poured over the top of the spout.

Another object of my invention is to provide a ladle that shall have a relatively cool handle member.

Another object of my invention is to provide a pouring ladle in which the spout extends substantially to the bottom of the ladle to permit pouring the entire contents of the ladle with a minimum turning of the same.

Another object of my invention is to provide a pouring ladle that shall have means for precluding obstructing the spout.

Another object of my invention is to provide a pouring ladle that shall have a single means for securing the heating element, a heat resisting insulator and a metal shield in such position, and in such manner as to positively resist the movement of these members in any direction.

A further object of my invention is to provide a pouring ladle that shall be inexpensive to construct and effective in its operation.

In practising my invention I provide a ladle having a unitary body or receptacle portion and a base portion constituting integral supporting legs. The body portion has an integral spout extending to the bottom of the body portion and a stud also integral therewith to which a handle is attached in such manner as to render the handle relatively cool.

The spout and handle are so disposed and of such dimensions that the ladle is balanced under all conditions of pouring, thus requiring a minimum exertion on the part of the user.

In the accompanying drawing Fig. 1 is a longitudinal sectional view taken through the handle of a ladle embodying my invention; and Fig. 2 is a view taken along the line II—II of Fig. 1, with parts broken away to show the bottom clamping cap.

A pouring ladle 1 embodying my invention comprises, in general, a body or receptacle portion 2 to receive the material to be melted, or maintained at a predetermined temperature, a base portion 3 constituting integral legs 4, a pouring spout 5, a handle 6, a heater 7, conductors 8 for attaching the heater to a source of energy and a connection chamber 9 for facilitating connecting the heater 7 to the conductors 8.

The body portion 2 and the base portion are preferably cast as a unit of aluminum or other suitable material and are separated by a partition 10. The spout 5 is entirely surrounded by metal to within a relatively short distance from its mouth and thus the heat may be conducted to the opening or mouth therein to maintain the opening at a relatively high temperature. The lower end of the spout 5 extends to substantially the partition 10 to thus permit pouring the entire contents of the ladle with ease and a minimum turning effort.

A stud 11 is cast integral with the ladle and is disposed on the side thereof substantially 90 degrees from the spout. The spout and handle are so arranged and proportioned as to size and weight that a minimum turning effect is expended in pouring the contents of the ladle. That is, the center of gravity is so low and the spout of such weight that there is a positive tendency to pour easily. The stud 11 is disposed above a chamber 9 which is provided with a cover plate 12 having an integral foot 13 to prevent tilting the ladle when empty by reason of the weight of the handle 6. A single screw 14 secures the cover plate 12 in position as its upper end is cut away, and provided with a notch 24 shown in broken lines in Fig. 2 to fit around and cooperate with a recess in the lower portion of the stud 11.

The stud 11 is provided with an opening 15 therein that communicates with an opening 16 from the chamber 9. A hollow rod 17 is disposed in the opening 15 and is adapted to receive a wooden handle portion 18 on the outer portion thereof. It will be noted that the stud 11 and the wooden portion 18 of the handle are counter bored as at 19 and 20, respectively, to reduce the area in contact with the rod 17 and with each other, and thus preclude the undue transfer of heat from the ladle to the hands of the operator.

The conductors 8 pass through the rod 17 into the passage 16 and the connection chamber 9 to facilitate connecting the same to the heater 7. The conductors as they pass through the chamber 9 are surrounded with insulating beads 25 or any other suitable insulating material. The beads 25 are preferably of porcelain that will not disintegrate under heat condition and are provided with ball and socket joints so arranged that a bend in the conductor 8 will not cause the conductor 8 to be exposed.

The heater 7 is an ordinary sheathed heating unit of circular form, that consists of a nichrome heating conductor embedded in alundum in intimate contact with a metallic sheath to facilitate efficient conduction of the heat. However, any other desired type of heating element may be used if desired. An asbestos mat or shield 21 is disposed adjacent the heater unit 7 and a cup member 22 having its sides slit as at 26 is disposed around the heater and the mat 21. A single screw 23 holds the cup, mat and heater in position. The cup member 22 is slit around its edges as at 26 to cause it to more firmly secure the heater in position and to prevent twisting of the same with the, consequent, twisting of the conductors from the heater to the connecting chamber which pass through an opening 27 in the cup member.

The mat 21 is provided to prevent the heat from the heater 7 from being radiated downwardly. The legs 4 are also so proportioned as not to conduct the heat to the table upon which the ladle is operated. With my improved pouring ladle it is possible to melt various materials without fear that the heat will be transmitted to the table upon which the device is located. That is, the heat will be usefully employed in heating the body portion of the device only. By reason of the nicety in the balance of the spout and the handle, an operator may pour the contents with a minimum of exertion.

I do not limit my invention to the specific structure illustrated, as various modifications may be made therein without departing from the spirit and scope of the invention as set forth in the appended claims.

I claim as my invention:

1. A pouring ladle comprising a body portion and a base portion having feet formed integral therewith, an electric heater disposed in the base portion beneath the body portion, a heat resisting member disposed beneath the heater and a resilient cap for securing the heater and the heat resisting member in position.

2. A pouring ladle comprising a body portion and a base portion having feet formed integral therewith, an electric heater disposed in the base portion beneath the body portion, a heat resisting member disposed beneath the heater, a slotted cap for positioning the heater and the heat resisting member in position, and a single screw for holding the cap in position.

3. A metallic ladle comprising a body portion, an enclosed pouring spout forming one side thereof, the fluid-containing capacity of said spout being a substantial part of the capacity of said body portion, a handle secured to said ladle near its center of gravity, and an electric heater disposed adjacent said spout.

4. A metal ladle comprising an integral body portion, a pouring spout of conical shape forming one side of said ladle, said spout having its lower side extending substantially from the top to the bottom of said ladle, a separating partition near the base of said spout, a lip at the apex of the conical spout structure for forming a thin stream of liquid during the pouring process, and an electric heater adjacent said spout.

5. A metal ladle comprising a body portion, a pouring spout of conical shape integrally secured thereto, the base of said conical spout having a diameter substantially equal to the height of said body portion, a heater element disposed beneath and in contact with said body portion, and a handle located in proximity to the center of gravity of said ladle.

6. A metallic ladle comprising a body portion, a funnel-like spout forming one side thereof, and an electric heater element disposed adjacent the bottom of said spout so that an appreciable part of the heat from said element is transmitted to the melt within said spout.

7. A metallic ladle comprising a body portion, a funnel-like spout forming one side thereof, the fluid-containing capacity of said spout being a substantial part of the capacity of said body portion, and a heater element disposed adjacent the bottom of said spout, the contents of said spout during the pouring process being maintained in molten condition by the heat retained within said spout and by additional heat transmitted from said element.

8. A pouring ladle comprising a body portion, an operating handle remotely positioned from its base, an electric heater disposed adjacent said base, a chamber extending substantially vertically along one side of said body portion, conductors extending from the operating handle through said chamber to the electric heater, and a cover plate for said chamber having a portion constituting a supporting leg or brace for maintaining the pouring ladle in upright position while resting on a horizontal surface.

9. A pouring ladle comprising a body portion, a hollow operating handle disposed adjacent the center of gravity of said ladle, an electric heater in proximity to the base of said body portion, a chamber extending along the side of said body portion and interconnecting said handle and heater, conductors extending through said operating handle and chamber to said heater, heat resisting means for protecting said conductors within said chamber, and a cover member detachable from said body portion for enclosing said chamber having an integral supporting leg or brace for maintaining the pouring ladle in upright position while resting on a horizontal surface.

In testimony whereof, I have hereunto subscribed my name this 5th day of February, 1925.

JOHN STRUTHERS DUNN.